United States Patent
Satoh

[19]

[11] Patent Number: 5,958,248
[45] Date of Patent: Sep. 28, 1999

[54] METHOD OF PRECIPITATING PROTEIN AT THE TIME OF REMOVAL OF HEAVY METALS

[76] Inventor: Yukimasa Satoh, 5-22, Jindaiji-higashimachi 6-chome, Chofu-shi, Tokyo, Japan

[21] Appl. No.: 08/904,633

[22] Filed: Aug. 1, 1997

[30] Foreign Application Priority Data

Aug. 9, 1996 [JP] Japan ................................. 8-210654

[51] Int. Cl.$^6$ .................................................. C02F 1/56
[52] U.S. Cl. ........................ 210/725; 210/710; 210/727; 210/738; 210/905; 210/912; 210/913; 530/421; 530/857; 530/859
[58] Field of Search .................................. 210/710, 724, 210/725, 726, 727, 738, 905, 912, 913; 530/419–421, 855, 857, 859

[56] References Cited

U.S. PATENT DOCUMENTS

| | | | |
|---|---|---|---|
| 4,119,495 | 10/1978 | Belyaev et al. | 195/102 |
| 4,256,630 | 3/1981 | Fremont | 210/710 |
| 4,483,829 | 11/1984 | Guardini | 423/55 |
| 4,629,785 | 12/1986 | McCaffery | 530/415 |
| 4,966,713 | 10/1990 | Keys et al. | 210/705 |
| 5,009,793 | 4/1991 | Muller | 210/710 |
| 5,051,191 | 9/1991 | Rasmussen et al. | 210/721 |
| 5,158,686 | 10/1992 | Kigel | 210/713 |
| 5,518,633 | 5/1996 | Brown et al. | 210/713 |
| 5,614,102 | 3/1997 | Sakurada | 210/718 |

FOREIGN PATENT DOCUMENTS 50-33142  10/1975  Japan ..................................... 210/905

Primary Examiner—Peter A. Hruskoci
Attorney, Agent, or Firm—Lorusso & Loud

[57] ABSTRACT

A method and a system which enable simple and inexpensive removal of heavy metals from a heavy-metal-containing substance. In this method, a substance containing heavy metals and water are introduced into a mixing bath in proportions by weight of 1:3 to 1:6. A strong acid is added to the mixture, and the mixture is stirred while its pH is maintained at a pH lower than 4. As a result of stirring of the substance at a pH 4, heavy metals are extracted into the liquid as metal ions. The metal-ion-containing liquid is input to a heavy metal precipitation bath, and the pH of the liquid is increased to a pH higher than 10 by addition of alkali to the liquid. Gas bubbles of carbonic acid gas are input to the liquid from a lower portion of the heavy metal precipitation bath, and they are broken into a large quantity of small gas bubbles of carbonic acid gas by turbine blades. The large quantity of gas bubbles of carbonic acid are brought into contact with the metal-ion-containing liquid having a pH higher than 10. As a result, metal ions are precipitated in the heavy metal precipitation bath as carbonates. If the substance is fish or shellfish, alkali and polymer are added to the heavy-metal-removed liquid in the heavy metal precipitation bath, and the liquid is stirred, whereby protein is precipitated.

5 Claims, 3 Drawing Sheets

METHOD OF PRECIPITATING PROTEIN AT THE TIME OF REMOVAL OF HEAVY METALS

BACKGROUND OF THE INVENTION

1. Field of the Invention

The present invention relates to a method of removing heavy metals from factory effluents, industrial garbage, sludge, and marine organisms, all of which contain heavy metals, as well as to a system for use with this method and to a method of precipitating protein at the time of removal of heavy metals.

2. Description of the Related Art

Effluents or garbage from factories are generated in the fields of mining, chemical engineering, and metals. To prevent environmental pollution, industrial wastes are processed after heavy metals have been removed from them, and the water used for removing heavy metals from the wastes is released after it has been purified to such a level as to satisfy environmental standards for discharge.

In accordance with conventional methods of removing heavy metals from heavy-metal-containing materials, sodium hydroxide is added to react with heavy metals such as Cr or Zn to thereby form $Cr(OH)_2$ or $Zn(OH)_2$. The heavy metals are then precipitated by addition of a macro molecular coagulant to the thus-formed hydroxides, and supernatant liquid resulting from precipitation is released.

From the viewpoint of environmental protection, the standards for discharging water used for removal of heavy metals have recently been rendered more rigorous, and satisfying the discharge standards through use of the conventional method has become difficult. Specifically, heavy metals must be removed from the water to a much greater extent.

In recent years, it has been acknowledged that innards of fish or shellfish contain a large quantity of heavy metals, and therefore the innards cannot be disposed of without removal of heavy metals.

SUMMARY OF THE INVENTION

The present invention is aimed at solving the aforementioned problem, and the object of the invention is to provide a method of economically and substantially removing heavy metals from a heavy-metal-containing substance, and a system for use with this method.

Another object of the present invention is to provide a method of removing heavy metals from a substance, e.g., fish and shellfish, and a method of removing protein from the fish and shellfish.

To these ends, in accordance with one aspect of the present invention, there is provided a method of removing heavy metals, the method comprising the steps of:

adding water and an acid to a heavy-metal-containing substance to thereby form a liquid having a pH equal to or lower than 4, and stirring the liquid;

extracting, into the liquid, heavy metals from the substance as heavy metal ions;

adding alkali to the liquid to thereby increase the pH of the liquid to 10 or more; and precipitating the heavy metal ions out of the liquid as a carbonate by bringing bubbles of carbonic acid gas into contact with the liquid having a pH equal to or higher than 10.

This heavy metal removal method allows easy removal of heavy metals from a heavy-metal-containing substance to thereby make the water used for removing heavy metals compliant with the discharge standards. Further, since this method requires only mixing of an acid and alkali with the substance and the stirring of the resultant liquid, it allows a large quantity of heavy-metal-containing substance to be processed.

In accordance with another aspect of the present invention, there is provided a system for removing heavy metals, the system comprising:

a container for storing a liquid which contains heavy metal ions;

a gas outlet port formed in the container that remains submerged in the liquid so as to permit ejection of carbonic acid gas into the liquid;

gas-bubble breaking means which is provided in a rotatable manner above the gas outlet port;

wherein the carbonic acid gas is introduced from the gas outlet port into the liquid which contains heavy metal ions while the liquid is held in the container, and resultant gas bubbles of the carbonic acid are each broken into small fragments by the gas-bubble breaking means.

In this heavy-metal removal system, the gas-bubble breaking means reduces gas bubbles of carbonic acid into small fragments, so that the fragments are dispersed uniformly. This promotes the reaction between the heavy metal ions and the carbonate. In addition, the quantity of supply of the carbonic acid gas is reduced, resulting in improved economy.

In accordance with still another aspect of the present invention, there is provided a method of precipitating protein at the time of removal of heavy metals, the method comprising the steps of:

adding water and an acid to a heavy-metal-containing substance, e.g., fish and shellfish, to thereby form a liquid having a pH equal to or lower than 4, and stirring the liquid;

adding alkali to the liquid to thereby increase the pH of the liquid to 10 or more;

precipitating and eliminating the heavy metal ions out of the liquid as a carbonate by bringing bubbles of carbonic acid gas into contact with the liquid having a pH equal to or higher than 10; and precipitating protein out of the liquid by adding to the carbonate-eliminated liquid alkali and polymer having a pH of 4 to 6, a With regard to a case where a heavy-metal-containing substance is fish and shellfish, protein can be easily coagulated and precipitated out of the liquid upon the addition of alkali and polymer to the heavy-metal-eliminated liquid by virtue of the method of precipitating protein at the time of removal of heavy metals.

EMBODIMENT OF THE PRESENT INVENTION

With reference to the accompanying drawings, the present invention will be described hereinbelow.

Figure 1:
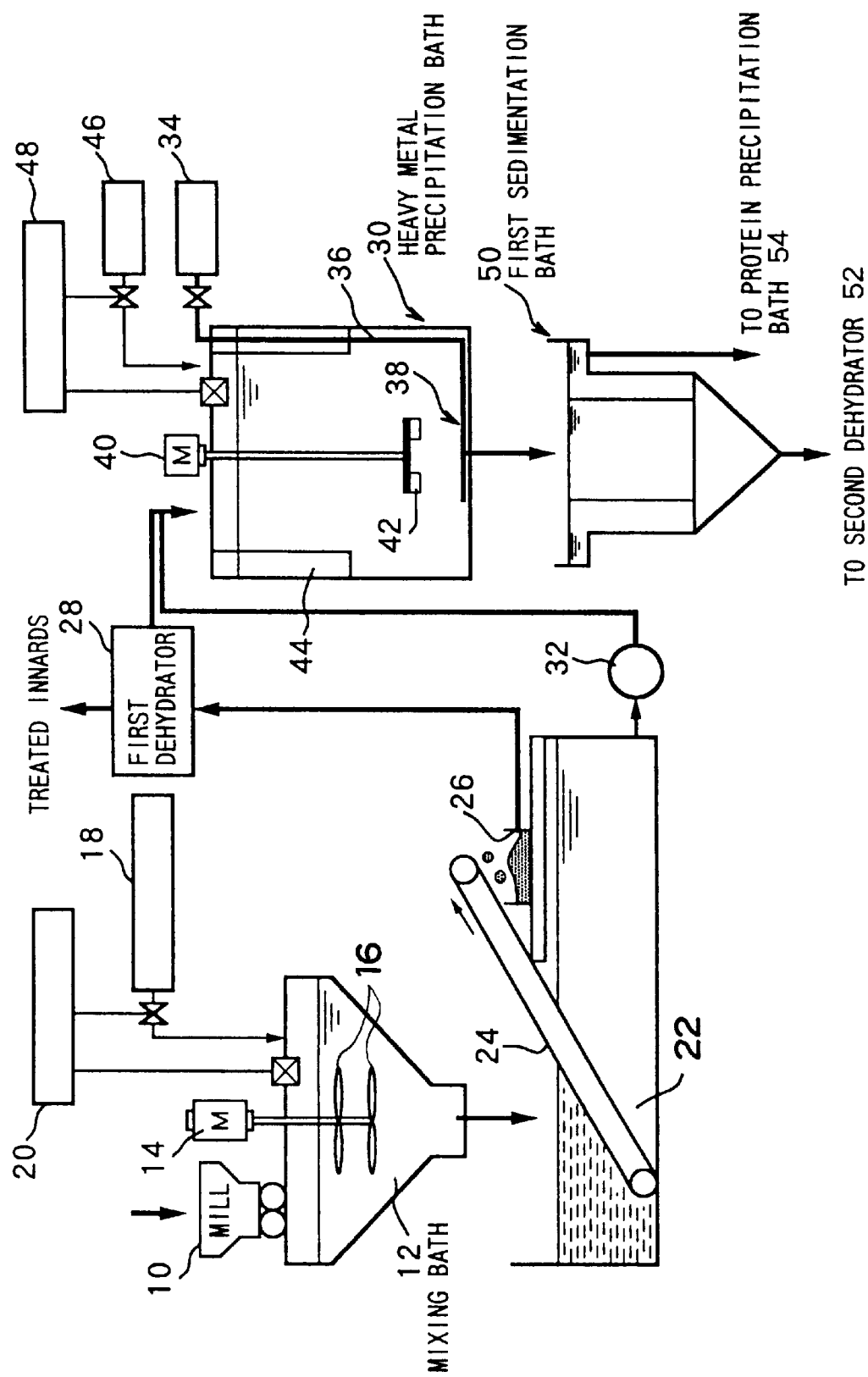
FIG. 1 is a schematic diagram illustrating part of a method of removing heavy metals according to the present invention.
Figure 2:
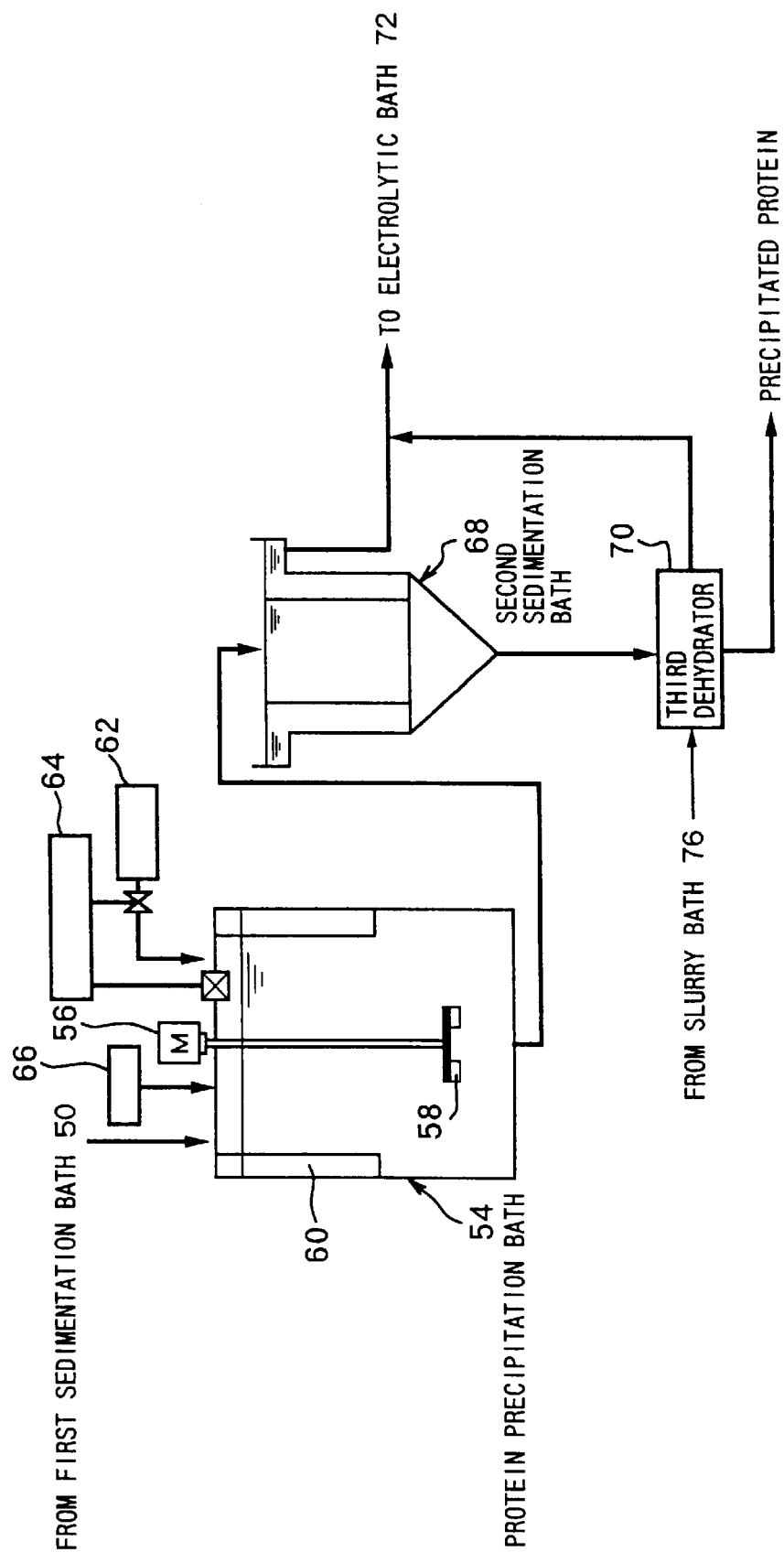
FIG. 2 is a view similar to FIG. 1, but showing subsequent steps of the heavy-metal removal method.
Figure 3:
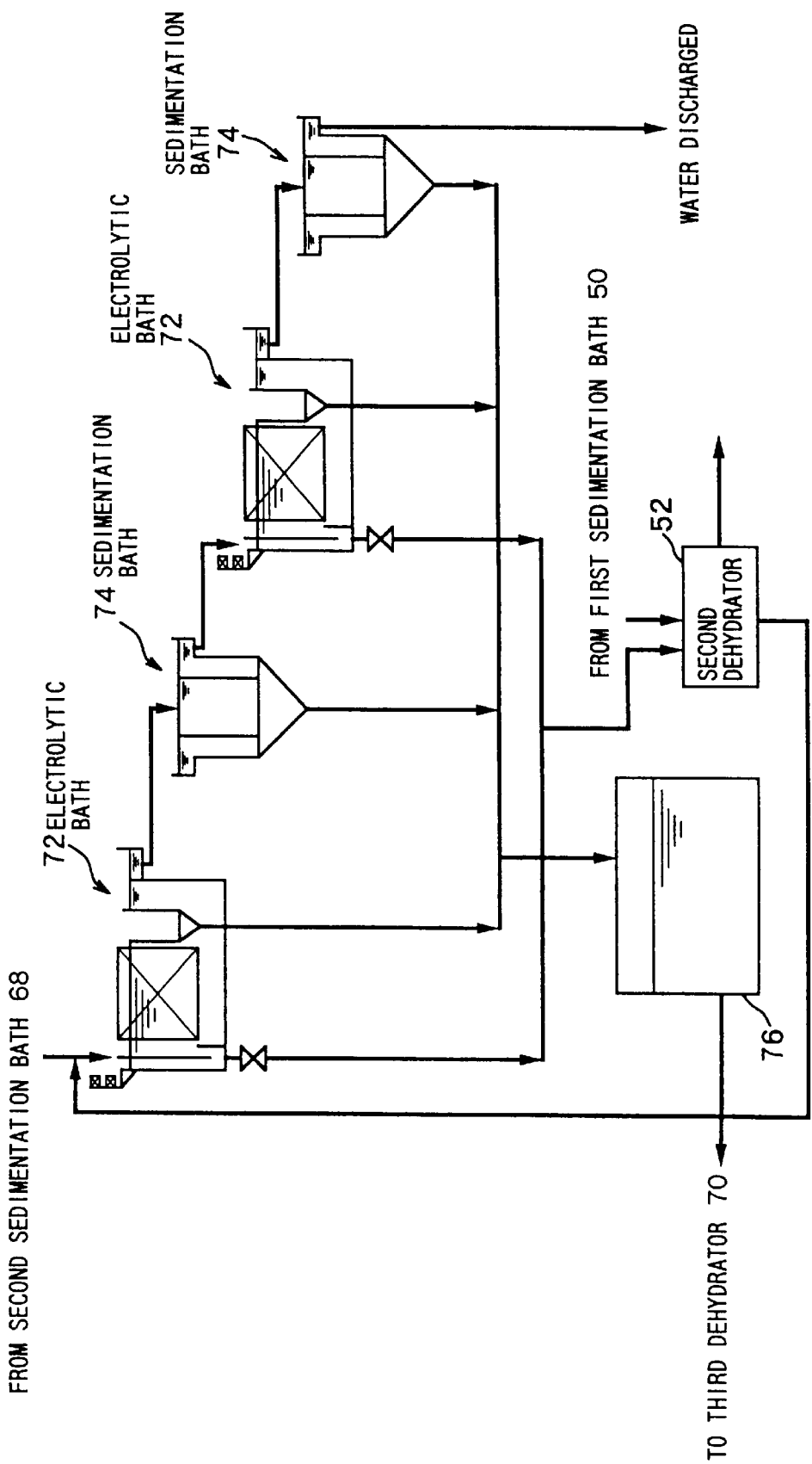
FIG. 3 is a view similar to FIG. 2, but showing subsequent parts of the heavy-metal removal method.

FIGS. 1, 2, and 3 are schematic diagrams showing the construction of a system for removing heavy metals from innards of a heavy-metal-containing scallop, and heavy metals are removed from the innards in the numerical order of the drawings. In FIGS. 1, 2, and 3, the innards of a scallop are handled as a substance from which heavy metals are removed, and explanations of other substances will follow the description of the innards of the scallop.

In FIG. 1, the innards of the scallop from which heavy metals are removed are finely milled by a mill 10, and the thus-milled innards are introduced into a mixing bath 12. It is desirable to mill the innards to as small fragments as possible so that a liquid can make sufficient contact with molecules of heavy metals contained in the innards. The thus finely-milled innards and water are fed into the mixing bath 12, and the innards and water are sufficiently stirred through use of agitating blades 16 driven by a motor 14.

First, the innards and water are fed into the mixing bath 12 in proportions by weight of about 1:1, and they are sufficiently stirred. Subsequently, the innards and water are fed into the mixing bath 12 in weight ratios of 1:3 to 1:6. The optimum weight ratio of the innards and water is about 1:4. If the innards are mixed together with a large quantity of water from the beginning, the innards cannot be sufficiently milled. Therefore, the innards and water are stirred in proportions by weight of about 1:1 at the outset.

After the innards and water are introduced in proportions by weight of about 1:3 to 1:6 into the mixing bath 12, a strong acid (e.g., a sulfuric acid having a pH 1 to 2) is also introduced into the mixing bath 12 from a chemical-dissolved bath 18. The strong acid is supplied to the mixing bath 12 in such a way that the pH of the liquid consisting of the innards, water, and the strong acid is lowered to 4 or less. In short, in order to reduce the pH of the liquid contained in the mixing bath 12 to a value lower than 4, a pH controller 20 regulates the quantity of supply of the strong acid.

As previously described, the weight ratio of the innards to water is set in the range of 1:3 to 1:6 in order to eliminate the following risks: Namely, if the innards and water are mixed in proportions by weight of lower than 1:3, there is risk of insufficient elution of heavy metals into water when a strong acid to be described later is mixed with them. In contrast, if the innards and water are mixed in proportions by weight of larger than 1:6, the quantity of supply of the strong acid must be increased, thereby adding to the cost.

If finely-milled innards are sufficiently stirred in a liquid having a pH equal to or lower than 4, heavy metals contained in the innards are separated from the innards in the form of metal ions, and the metal ions are eluted into water, or into the liquid. Finely milling the innards allows a reduction in the time required for metal ions to elute into the water.

After the heavy metals have sufficiently eluted into the liquid as metal ions, the substances held in the mixing bath 12 are introduced to a screen filtration bath 22 for separating the innards from the liquid. In the screen filtration bath 22, there is provided a screen conveyor 24, which partitions the inside of the screen filtration bath 22 into two sections. The screen conveyor 24 conveys the innards to a container bath 26 outside the screen filtration bath 22 and filters the liquid by removing the innards from it and into the container bath 26.

The innards thus collected into the container bath 26 are then carried to a first dehydrator 28. The liquid obtained by the first dehydrator 28 is introduced to a heavy metal precipitation bath 30. The heavy metals contained in the innards are eluted into water, and no residual heavy metals remain in the innards. Therefore, the innards dehydrated by the first dehydrator 28 can be safely disposed of.

The liquid obtained as a result through passage through the screen conveyor 24 is introduced into the heavy metal precipitation bath 30 by a pump 32.

The heavy metal precipitation bath 30 has a cylindrical shape which is closed at its lower end and is open at its upper end. Carbonic acid supply device 34 is provided outside the heavy metal precipitation bath 30, and a gas pipe 36 is extended to the bottom center of the heavy metal precipitation bath 30 from the carbonic acid gas supply device 34. A gas outlet port 38 having a small diameter (e.g., 0.5 to 0.7 mm) is disposed on the upper portion of the gas pipe 36 at the bottom center of the heavy metal precipitation bath 30.

A plurality of turbine blades 42 which serve as gas-bubble breaking means to be rotated by a motor 40 are provided at an elevated position slightly higher than the gas outlet port 38 but sufficiently in the vicinity of the bottom center of the heavy metal precipitation bath 30. The center of rotation of the turbine blades 42 and the gas outlet port 38 provided on the gas pipe 36 are in alignment with the longitudinal axis of the cylindrical heavy metal precipitation bath 30.

Baffle plates 44 are longitudinally provided along the internal wall surface of the heavy metal precipitation bath 30 so as to protrude toward the center axis of the heavy metal precipitation bath 30. The baffle plates 44 extend from the position above the turbine blades 42 up to the upper edge of the heavy metal precipitation bath 30.

The liquid removed by the first dehydrator 28 and the liquid from the pump 32 by way of the screen conveyor 24 are introduced to a sufficiently high position in the heavy metal precipitation bath 30. Further, an alkaline liquid such as NaOH is added to the heavy metal precipitation bath 30 from a chemical-dissolved water bath 46 in order to increase the pH of the liquid in the heavy metal precipitation bath 30 up to a pH not lower than 10. The liquid in the heavy metal precipitation bath 30 is stirred by the turbine blades 42, and the quantity of the alkaline liquid which is introduced from the chemical-dissolved water bath 46 in order to increase the pH of the liquid to 10 or more is regulated by a pH controller 48. The alkaline liquid is not limited to NaOH.

If the pH of the liquid in the heavy metal precipitation bath 30 has been increased to a pH not lower than 10, carbonic acid gas is introduced to the gas pipe 36 from the carbonic acid gas supply device 34. The carbonic acid gas is ejected as small gas bubbles from the gas outlet port 38 provided at the bottom center of the heavy metal precipitation bath 30. At this time, the turbine blades 42 are rotated at a high rotational speed of, e.g., 1000 r.p.m.

Preferably, small gas bubbles of the carbonic acid gas surfacing upwards from the gas outlet port 38 are broken into small fragments having a diameter of 1 micron or less by the turbine blades 42 rotating at a high speed. The thus-fragmented gas bubbles are scattered in the radial direction of the turbine blades 42 by centrifugal force. As described above, the carbonic acid gas can be brought into sufficient contact with the liquid by fragmenting the gas bubbles, thereby to allow a smaller amount of supply of carbonic acid gas.

Even if the turbine blades 42 are rotated at a high speed, the baffle plates 44 provided along the inner wall surface of the heavy metal precipitation bath 30 prevent swirls from arising in the heavy metal precipitation bath 30. Accordingly, the level of the liquid is retained substantially horizontal, which prevents the liquid from overflowing from the heavy metal precipitation bath 30.

Gas bubbles of the carbonic acid gas measuring less than 1 micron are substantially uniformly scattered in large quantities in the cross section of the heavy metal precipitation bath 30 and surface while remaining in contact with the liquid. The gas bubbles of the carbonic acid gas come into sufficient contact with the fluid during the course of surfacing to the level of the liquid. Various heavy metal ions included in the liquid come into contact with carbonic acid gas, thereby resulting in formation of the following compounds;

$Cr(OH)_3$—$CrCO_3$
$Pb(OH)$—$PbCO_3$
$Cd(OH)_2$—$CdCO_3$
$Mn(OH)_2$—$MnCO_3$
$Cu(OH)_2$—$CuCO_3$
$Hg(OH)_2$—$Hg_2CO_3$
$Zn(OH)_2$—$ZnCO_3$

As described above, carbonates are formed by the reaction of heavy metals with $CO_2$. Similarly, heavy metals other than the foregoing heavy metals are formed into carbonates.

Carbonates such as $CrCO_3$ are precipitated as white substances in the heavy metal precipitation bath 30. In a state in which the majority of heavy metals are precipitated out of the liquid as carbonates, the pH of the liquid in the heavy metal precipitation bath 30 is five or thereabouts.

The thus-precipitated carbonates in the heavy metal precipitation bath 30 and the liquid having a pH of about five from which the carbonates have been precipitated are introduced into a first sedimentation bath 50. The carbonates settle in the first sedimentation bath 50, and the thus-settled carbonates are introduced to a second dehydrator 52 (see FIG. 3). The second dehydrator 52 removes water from carbonates to thereby form a heavy metal mixture. This heavy metal mixture is sent to a refinery, where various heavy metals are separately removed from the heavy metal mixture. These heavy metals are recycled.

The liquid still remaining in the first sedimentation bath 50 after the carbonates have been removed is transferred to a protein precipitation bath 54. The liquid transferred to this protein precipitation bath 54 contains a large quantity of protein removed from the innards of the scallops and has a pH of about five.

Agitating blades 58 rotated by a motor 56 are provided in a protein precipitation bath 54, and baffle plates 60 are longitudinally provided on the inner wall surface of the protein precipitation bath 54.

Alkali such as NaOH is transferred from a chemical-dissolved water bath 62 to the precipitation bath 54 into which the liquid has already been introduced. In order to make the pH of the liquid stored in the protein precipitation bath 54 substantially neutral, the quantity of an alkaline liquid to be transferred from the chemical-dissolved water bath 62 is controlled by a pH controller 64. Polymer is introduced into the protein precipitation bath 54 from a polymer storage bath 66, as required.

The liquid stored in the protein precipitation bath 54 into which alkali and polymer have been added is stirred by the agitating blades 58. As a result of the stirring of the liquid, protein is precipitated in the protein precipitation bath 54 form a slurry.

After the protein has been precipitated in the form of slurry in the protein precipitation bath 54, the liquid and the slurry are transferred to a second sedimentation bath 68. The protein slurry settles on the bottom of the second sedimentation bath 68, and only the thus-settled protein slurry is removed from the second sedimentation bath 68 and introduced into a third dehydrator 70. Protein can be removed by eliminating the liquid from the slurry through use of the third dehydrator 70. The thus-obtained protein can be recycled as feed for animals.

The liquid still remaining in the second sedimentation bath 68 after the protein has settled and the liquid output from the third dehydrator 70 are generally water that is in compliance with the standards for discharge.

If heavy metals remain in the liquid in slight concentrations, and hence the liquid falls slightly short of the standards for discharge, the liquid is finally purified to water in compliance with the standards for discharge by feeding the liquid further to a plurality of conventionally-known electrolytic cells 72 and a plurality of sedimentation baths 74 shown in FIG. 3. The results of the measurement of the water to be released is as follows:

pH: 7±0.5,
B.O.D.: 20 mg/l or less,
C.O.D.: 20 mg/l or less,
S.S.: !0 mg/l or less,
N-Hex: 3 mg/l or less
Bacteria: N/D Protein still remains in the residual liquid in the second sedimentation bath 68 which results from precipitation of protein and in the liquid output from the third dehydrator 70, and hence protein is removed from the liquid by feeding the liquid to the electrolytic cells 72 and the sedimentation baths 74 during the course of the circulation of the liquid through the baths.

The liquid may be fed to the heavy metal precipitation bath 30 in place of the electrolytic baths 72 and the sedimentation baths 74; however this adds to the cost.

The electrolytic baths 72 are intended to remove a small quantity of heavy metal contained in the liquid. Through electrolysis of the liquid, heavy metals are collected on a cathode, and the thus-collected heavy metals are then removed. The heavy metals deposited on the cathode 76 of each electrolytic bath 72 are introduced into the second dehydrator 52 and dehydrated to form a heavy metal mixture.

Residual protein which has not been removed in the second sedimentation bath 68 is still contained in the liquid to be fed to the electrolytic baths 72 and the sedimentation baths 74. The protein is removed from the liquid in the electrolytic baths 72 and the sedimentation baths 74 by sedimentation, and the thus-settled protein is collected into a slurry bath 76. The protein collected in the slurry bath 76 is introduced into the third dehydrator 70 and is dehydrated, to thereby separate the protein.

Although the removal of heavy metals from the innards of scallops and the removal of protein from the same have been described in the foregoing embodiment, the method is applicable to removing heavy metals from other heavy-metal-containing substances.

In addition to fish and shellfish, factory effluents, industrial garbage, and sludge are thought to contain heavy metals. A method of removing heavy metals from these substances is substantially the same as the method of removing heavy metals from the innards of scallops. However, they may be slightly different from each other, according to the substance, with regard to pre-processing which is required prior to introduction of the substance into the mixing bath 12. The same system used for removing heavy metals from the innards of the scallops is used for removing heavy metals from these other substances.

The factory effluents need not to be fragmented, and hence they are directly input to the mixing bath 12. Alternatively, the moisture included in the factory effluents is evaporated until the effluents become sludge. The thus-formed sludge is input to the mixing bath 12, which requires only an economic amount of a strong acid. Either of the methods can be employed. In other respects, the removal of heavy metals from the factory effluents is the same as the removal of heavy metals from the innards of the scallops.

Industrial dry garbage is smashed into powder before it is introduced into the mixing bath 12. In other respects, the removal of heavy metals from the industrial garbage is the same as the removal of heavy metal from the innards of the scallops.

Heavy metals are removed from sludge in the same way that the heavy metals are removed from the innards of the scallops.

The factory effluents, industrial garbage, or sludge do not include protein and hence do not require the use of the protein precipitation bath 54 used when removing protein from the innards of the scallops.

The following show contents of heavy metals in blocks of industrial garbage before and after removal of heavy metals in accordance with the method through use of the system of the present invention:

| Type of Heavy Metal | Industrial Garbage | Heavy-metal-removed Industrial Garbage |
|---|---|---|
| Cr | <250 mg/l | <0.005 mg/l |
| Cu | <360 mg/l | <0.01 mg/l |
| Pb | <710 mg/l | <0.005 mg/l |
| Zn | <3490 mg/l | <0.013 mg/l |

As described above, if a heavy-metal-containing substance is processed by the heavy metal removal method through use of the heavy metal removing system of the present invention, heavy metals can be substantially completely removed.

I claim:

1. A method for removing heavy metals from a substance containing protein and for recovery of protein from the substance, the method comprising:

adding water and an acid to the substance to thereby form a liquid having a pH equal to or lower than 4 and to thereby elute the heavy metals into the liquid and remove protein from the substance;

separating the liquid containing the removed protein and eluted, heavy metal ions from the substance;

adding alkali to the separated liquid to thereby increase the pH of the liquid to 10 or more;

contacting the separated liquid containing protein and the heavy metal ions, in a tank, with carbonic acid gas to precipitate the heavy metal ions, as carbonates, from the liquid;

separating the precipitated carbonates from the liquid; and then adding alkali and polymer to the liquid, while stirring the liquid, to substantially neutralize the liquid and to precipitate said removed protein.

2. A method according to claim 1 further comprising:

stirring contents of the tank with a stirrer having a bladed rotor rotatable about a central axis; and introducing the carbonic acid gas into the tank at a location below the bladed rotor whereby the bladed rotor breaks up the introduced carbonic acid gas into fine bubbles for contact with the heavy metal ions.

3. A method according to claim 2 wherein said location is aligned with said central axis.

4. A method according to claim 1 wherein said substance containing protein is a marine organism.

5. A method according to claim 1 wherein a weight ratio of the substance containing protein to water is set to 1:3 to 1:6.

* * * * *